Jan. 30, 1968

E. A. OHM 3,366,792

LASER INTRACAVITY PHASE MODULATOR

Filed Jan. 14, 1965

INVENTOR
E. A. OHM
BY
Kenneth W. Mateer
ATTORNEY

United States Patent Office 3,366,792
Patented Jan. 30, 1968

3,366,792
LASER INTRACAVITY PHASE MODULATOR
Edward A. Ohm, Shrewsbury, N.J., assignor to Bell Telephone Laboratories, Incorporated, New York, N.Y., a corporation of New York
Filed Jan. 14, 1965, Ser. No. 425,572
9 Claims. (Cl. 250—199)

ABSTRACT OF THE DISCLOSURE

A wide index, intracavity, phase modulator for electromagnetic wave energy. In a laser embodiment, a plane polarized main energy beam passes through three birefringent elements, the first and third of which convert a portion of the main beam to first and second variable amplitude components orthogonal to the main beam polarization and in time quadrature with each other. The second element introduces a 90 degree time phase delay to the main beam. Output consists of the resultant of the two converted components.

---

Figure 1:
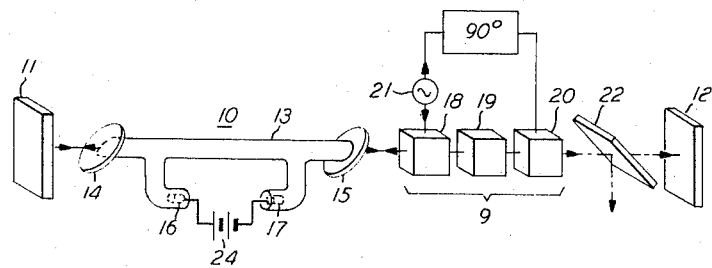

This invention relates to phase modulators and, more particularly, to intracavity arrangements for phase modulating laser beams.

Means for generating electromagnetic waves in the infrared, visible, and ultraviolet frequency ranges, hereinafter referred to collectively as the optical frequency range, have been disclosed in United States Patent No. 2,929,922 issued to A. L. Schawlow and C. H. Townes and in the copending United States application of A. Javan, Ser. No. 277,651, filed May 2, 1963, and assigned to the assignee of this application.

Wave energy generated in the manner explained by Schawlow et al. and by Javan is characterized by a high degree of monochromaticity and coherence. Additionally, because of the very high frequency of wave energy in the optical portion of the frequency spectrum, such energy is potentially able to carry enormous amounts of information and is, therefore, particularly useful as a carrier wave in a communication system. However, efficient utilization of this great information carrying potential depends on the availability of means for modulating wave energy at the high frequencies involved.

Various arrangements have been disclosed for amplitude modulating optical waves. However, due to various amplitude nonlinearities in the optical materials used, as well as in the typical associated components such as amplifiers and demodulators, an amplitude modulated signal would experience spurious amplitude modulation as it propagates along the system. At the same time, the signal to noise ratio associated with angle modulation—frequency or phase—is considerably higher.

In the copending application of S. E. Miller, Ser. No. 374,326, filed June 11, 1964, and assigned to the assignee of this application, an intracavity phase modulation system for optical frequency energy is disclosed in which the phase index of the output varies in accordance with the amplitude of a voltage signal applied to one of a series of birefringent crystals through which the optical carrier passes. The Miller arrangement is, however, limited to a phase angle variation of ±45 degrees. Additionally, the phase modulated signal exhibits amplitude modulation in addition to phase modulation.

It is the object of the present invention to phase modulate optical wave energy over a wide range of values of phase index.

It is a more specific object of the invention to achieve phase modulation over a wide index range within an optical cavity.

A further object is to phase modulate an optical maser signal without simultaneously introducing significant amplitude modulation.

In accordance with the invention, phase modulation of an optical wave is produced by inducing first and second wave components having polarizations perpendicular to that of the optical beam within a laser cavity. The first induced component is amplitude modulated at the desired modulating frequency, and the second induced component is also amplitude modulated at the desired modulating frequency, but is delayed 90 degrees in time phase with respect to the first component. The modulation of the second component is therefore identical in form to that of the first component, but the components are in time quadrature. That is, a 90 degree time delay is introduced between the modulating signals applied to the birefringent crystals producing the converted components.

The converted components, both having a polarization at right angles to that of the laser beam, are coupled out of the cavity by polarization selective means. The resultant of the converted components is a phase modulated wave having a phase index which can vary over a substantially unlimited range.

In a first embodiment of the invention, the phase modulated signal is produced during a single passage of the laser beam in one direction through the modulator. In another embodiment of the invention, the phase modulated signal is the summation of a plurality of passages through the modulation structure, thereby producing an output signal of increased amplitude.

Figure 2:
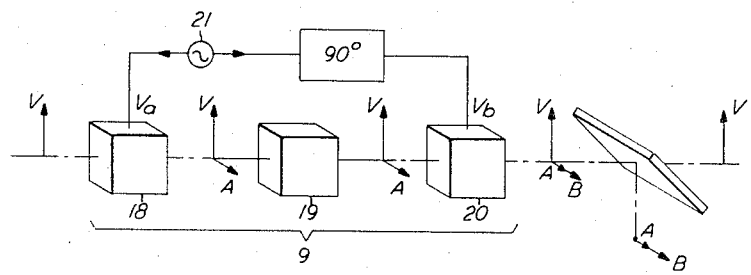
Figure 3:
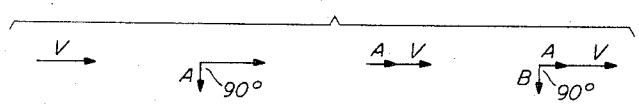
Figure 4:
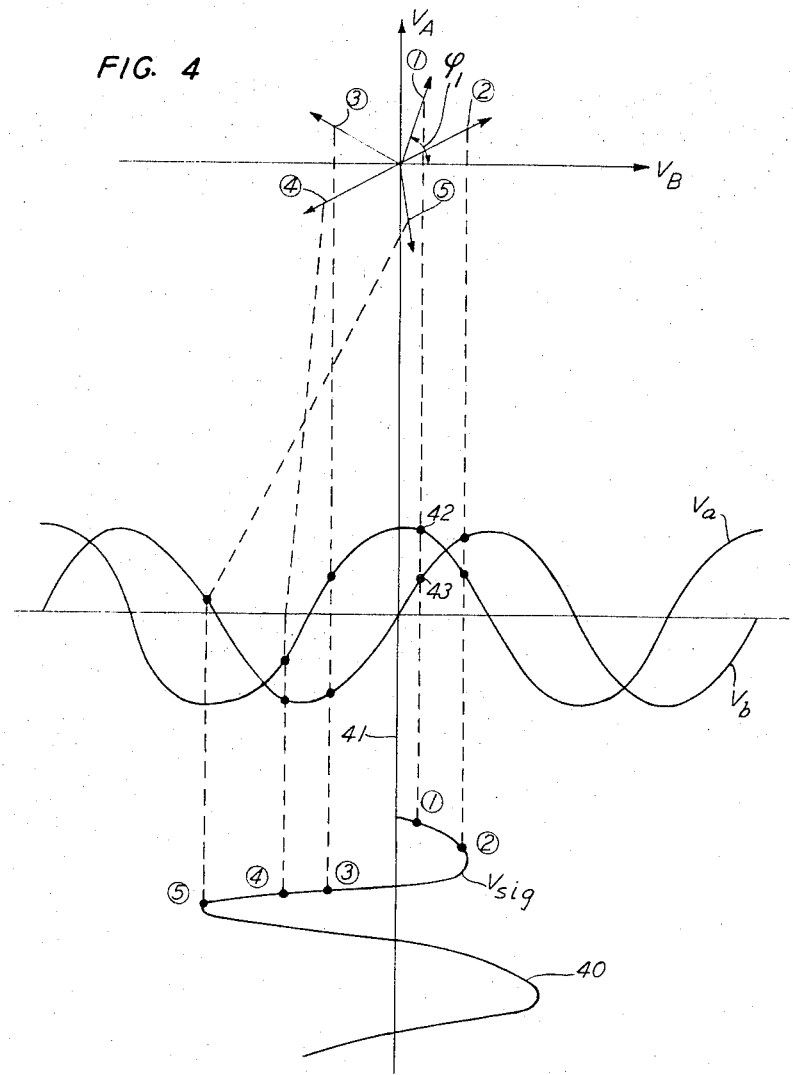
Figure 5:
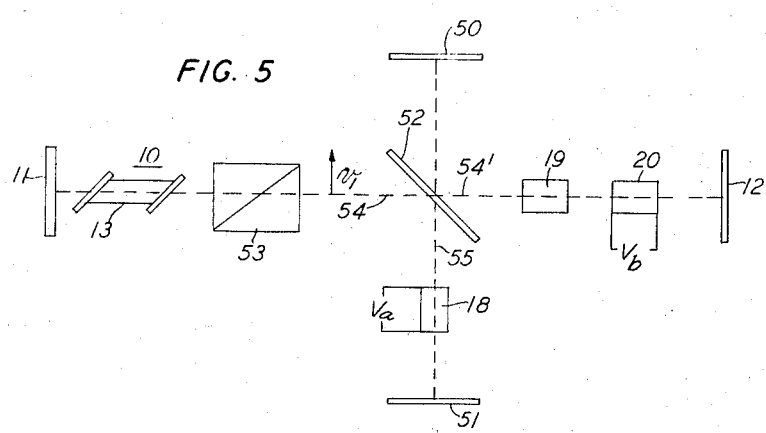
Figure 6:
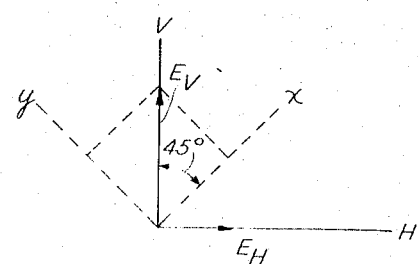
Figure 7:
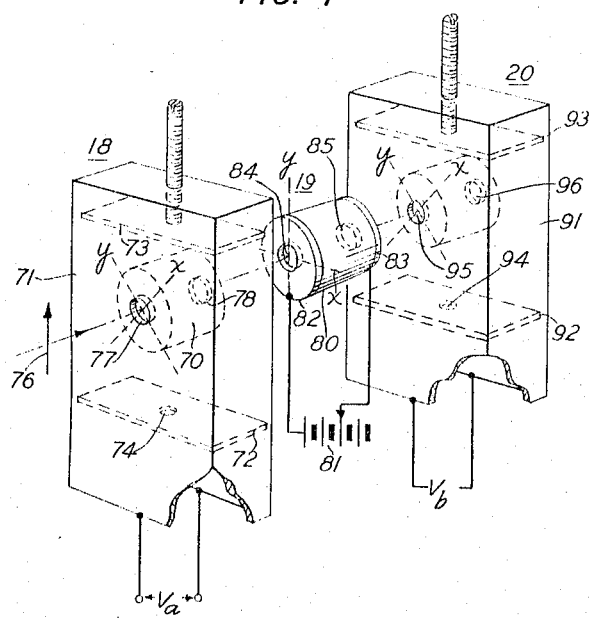

The above and other objects of the present invention, together with its various features and advantages, will become more readily apparent upon consideration of the detailed description of the embodiments shown in the accompanying drawing, in which:

FIG. 1 is a first embodiment of the invention in which a wide index phase modulator is disposed within a laser cavity;

FIGS. 2 and 3, given for purposes of explanation, illustrate the space phase and time phase relationships of the various wave components at selected locations within the modulator of FIG. 1;

FIG. 4 graphically illustrates the relationships between modulating signal and modulating voltages which produce the wide index phase modulation;

FIG. 5 is an alternate embodiment of the invention in which the output energy level is increased;

FIG. 6, given for purposes of explanation, shows the two principal planes of a birefringent material and a linearly polarized wave applied at a 45 degree angle thereto; and FIG. 7 is one specific illustrative embodiment of the modulator portion of the arrangement of FIG. 1.

Referring now in detail to the drawing, FIG. 1 is an illustrative embodiment of a wide index laser modulation system comprising an active medium 10 and a modulator 9 disposed within a cavity defined by the reflectors 11 and 12.

Because the invention is of particular interest at optical frequencies, it is described herein in connection with optical masers, or lasers. Thus, for purposes of illustration, the active medium is depicted as a gaseous mixture of helium and neon enclosed in an elongated tube 13. However, it is to be understood that the principles of the invention are applicable at any frequency for which a maser can be constructed and is not limited to the optical frequency band.

To minimize reflections and to polarize the laser beam, the ends 14 and 15 of tube 13 are inclined at the Brewster angle. A D.C. power source 24 is connected to electrodes 16 and 17 for supplying the power necessary to produce and maintain a gas discharge within tube 13. It is to be understood, however, that other means, well known in the art, can be employed for producing a population inversion in the active medium and that other materials can be used as the active medium. For a detailed discussion of lasers, see the article by A. Yariv and J. P. Gordon, entitled "The Laser," published in the January 1963 issue of the Proceedings of the Institute of Radio Engineers.

The reflectors 11 and 12, which define the laser cavity, can have plane surfaces, curved surfaces, or a combination of one plane surface and one curved surface. In the present invention, it is not necessary that at least one of the reflectors be partially transmissive to couple wave energy out of the cavity since the output is derived in another way, as will be described in greater detail hereinafter.

Phase modulation of a portion of the beam is accomplished by means of a phase modulator 9 comprising the three stages 18, 19, and 20 interposed along the beam path between the active medium 10 and one of the cavity reflectors, such as reflector 12. Before proceeding with a detailed discussion of the function of each of these stages, some general comments about phase modulation will be made.

Phase modulation is defined in The International Dictionary of Physics and Electronics as "Angle modulation in which the angle of a sine-wave carrier is caused to depart from the carrier angle by an amount proportional to the instantaneous value of the modulating wave." It is shown, on page 595 of Electronic and Radio Engineering by F. E. Terman, fourth edition, that a phase modulated wave having a modulation index small compared with unity can be considered as comprising two components of the same frequency, but delayed 90 degrees in time phase with respect to each other, the first of these components having a constant amplitude and the other varying in amplitude in accordance with the modulating signal.

Such a low-index phase modulator is disclosed in the before-mentioned copending application of S. E. Miller. The low index limitation, however, renders such a system inappropriate for some communications applications.

In accordance with the present invention, the low index limitation is eliminated by producing in the stages designated 18, 19 and 20 of FIG. 1 two wave components whose amplitude and time phase relation are such as to combine to produce a wide index phase modulated signal. More specifically, the first stage 18 is a polarization converter for converting a portion of the maser beam, which is polarized in a first direction by means of the inclined ends 14 and 15 of tube 13, to a first wave component, A, of variable amplitude, polarized perpendicular to the direction of polarization of the laser beam. For the purposes of discussion, hereinafter, the laser beam shall be considered as vertically polarized and the converted wave energy as horizontally polarized. The second stage 19 is a differential phase shifter, which introduces a 90 degree time phase shift between the laser beam and the first converted wave component. The third stage 20 is a second polarization converter which converts a second portion of the vertically polarized laser beam to a second horizontally polarized wave component, B, of variable amplitude. The amplitude of the second component, while identical to that of the first, is in time quadrature therewith. That is, the first and second converted components both vary in amplitude in accordance with a modulating signal derived from a modulating source 21, but with a 90 degree time delay.

Because the two induced components are polarized perpendicular to the direction of the laser beam, they can be extracted selectively from the cavity by means of a polarization selective reflector 22 interposed along the beam path. This can be a Nicol prism of the type described on pages 500 to 502 of the third edition of Fundamentals of Optics by F. A. Jenkins and H. E. White, or any other means known in the art.

The output wave then comprises two horizontally polarized wave components, A and B, in time quadrature, having amplitudes which vary in accordance with the modulating signal. If A is defined as $KV_A \cos \omega t$ and B as $$KV_B \cos\left(\omega t - \frac{\pi}{2}\right)$$

where $$V_A = K_1 \cos(m \cos \omega_b t)$$

and $$V_b = K_1 \cos\left(m \cos \omega_b t - \frac{\pi}{2}\right)$$

in which $m$ is the phase index defined as $\Delta\omega/\omega_b$ for frequency modulation and $\Delta\omega$ for phase modulation, the signal output is $$K_2 \cos(m \cos \omega_b t) \cos \omega t + K_2 \sin(m \cos \omega_b t) \sin \omega t$$

or $$E_{out} = K_2 \cos(\omega t - m \cos \omega_b t)$$

the equivalent of an angle (frequency or phase), modulated wave.

FIG. 2 and FIG. 3, included for purposes of explanation, show the space phase relationship and the time phase relationships, respectively, of the master beam and the induced components as they propagate through the several stages 18, 19, and 20 of modulator 9. Assuming the maser beam is vertically polarized, the input wave to the first stage 18 in FIG. 2 is indicated by the vertical vector marked V. In the time diagram of FIG. 3, the input beam, also designated V, is the horizontally directed reference vector.

The output from stage 18 comprises the vertically polarized wave V and a smaller, horizontal component designated A, which is amplitude modulated in accordance with the signal $V_a$ derived from source 21. Thus, in the space diagram of FIG. 2, the component A is oriented perpendicular to V. In the time diagram of FIG. 3, component A is at 90 degrees to V.

Components V and A then enter the differential phase shifter 19, which puts them back in time phase but does not affect their space phase relationship. Thus, while there is no change in the direciton of polarization of these two components as they pass through stage 19, there is a 90 degree time phase delay introduced to V. Accordingly, the time phase angle between V and A is reduced to zero, as shown in FIG. 3.

The third stage 20 is another polarization converter whose output consists of the vertically polarized beam V, and two horizontal components. One component is the previously produced component A which is substantially unaffected by the traversal of stage 20. The other is an additionally induced component, B, which is amplitude modulated in accordance with the signal $V_b$ derived from signal source 21, by adding a phase delay of 90 degrees. The two components A and B are aligned in space, since they are both horizontally polarized. In time, however, the B component is in time quadrature with both the component V and the A component.

The output from the cavity, accordingly, is a wave comprising the sum of the modulated components A and B, shown above to be a phase modulated wave.

The above discussion has been directed to the general arrangement for wide index phase modulating a portion of the cavity wave energy. In the discussion to follow, specific arrangements are considered for inducing the various wave components and adjusting their phases.

As is well known, there are electro-optical materials which become birefringent when subjected to an electric field. By the term "birefringent," it is meant that the material exhibits a different index of refraction for light polarized in different directions. One such material is potassium dihydrogen phosphate ($KH_2PO_4$), more commonly referred to simply as KDP. Normally, KDP is optically uniaxial with the optic axis along the tetragonal Z axis. Light propagating parallel to the optic axis travels with the same velocity independent of the direction of polarization. However, upon the application of an electric field in the direction of the Z axis, the crystal symmetry is altered to ortho-rhombic and the crystal becomes biaxial. As a result, the index of refraction for light propagating along the Z direction is different for light polarized in different directions. In particular, there are two mutually perpendicular directions, commonly referred to as the principal planes, for which the difference in refractive indices is a maximum. The relative phase retardation, $\Gamma$, between waves propagating along the two principal planes (i.e., principal waves), over a distance L, is given by $$\Gamma = \pi E L / K \quad (1)$$

where

E is the electric field impressed across the crystal, and K is the value of EL for half wave retardation.

Referring to FIG. 6, if a verticaly polarized applied wave, represented as $$E_v = E_o \sin \omega t \quad (2)$$

is incident upon a birefringent material so that its direction of polarization makes a 45 degree angle with the principal planes, $x$ and $y$, the wave can be resolved into two orthogonal principal waves $$E_x = 0.707 E_o \sin \omega t \quad (3)$$

and $$E_y = 0.707 E_o \cos \omega t \quad (4)$$

Due to the difference in the refractive indices, a relative pulse difference, $\Gamma$, is produced between the $x$ and $y$ plane waves, such that at the output end of the material the principal waves are given by $$E_x = 0.707 E_o \sin \omega t \quad (5)$$

and $$E_y = 0.707 E_o \sin (\omega t + \Gamma) \quad (6)$$

In terms of the vertical and horizontal directions, the output is given by $$E_v = 0.707 E_x + 0.707 E_y \quad (7)$$

and $$E_H = 0.707 E_x - 0.707 E_y \quad (8)$$

Noting that $\sin (\omega t + \Gamma) = \cos \Gamma \sin \omega t + \sin \Gamma \cos \omega t$, Equations 7 and 8 can be rewritten as $$E_v = 0.5 E [(1 + \cos \Gamma) \sin \omega t + \sin \Gamma \cos \omega t] \quad (9)$$

and $$E_H = 0.5 E_o [(1 - \cos \Gamma) \sin \omega t - \sin \Gamma \cos \omega t] \quad (10)$$

In order not to load the maser cavity unduly, only a small amount of energy is converted from the vertical wave to the horizontal wave. (Typically, $E_H$ is about one-tenth of $E_v$.) This is controlled by making $\Gamma$ much less than one radian. With $\Gamma \ll 1$, $\cos \Gamma \approx 1$ and $\sin \Gamma = \Gamma$, and Equations 9 and 10 can be simplified to $$E_v \approx 0.5 E_o (2 \sin \omega t) \quad (11)$$

and $$E_H \approx 0.5 E_o (-\Gamma \cos \omega t) \quad (12)$$

Equations 11 and 12 show that under the specified conditions, the horizontal wave component produced by the polarization converter is 90 degrees out of time phase with the vertical wave component, as shown in FIG. 3.

Equation 12 also shows that the amplitude of the $E_H$ wave component varies proportionately with $\Gamma$. Thus if the electric field applied to the birefringent crystal is amplitude modulated, thereby causing the relative retardation $\Gamma$ to vary proportionately in the manner provided by Equation 1, the amplitude of the $E_H$ wave component is similarly modulated in accordance with the modulating signal.

The wide index nature of the present invention can be more easily understood by reference to FIG. 4 in which the resultant characteristics of the modulated signal are shown graphically. In FIG. 4, an arbitrary modulating signal 40 is illustrated about vertical axis 41. From any given point on signal 40, two values of the quadrature modulating voltages, $V_a$ and $V_b$ are defined. Thus, for example, point 1 on curve 40 corresponds to point 42 on voltage curve $V_a$ and simultaneously to point 43 on voltage curve $V_b$, which lags $V_a$ by 90 degrees. The resultant of voltage vectors $V_{a_1}$ and $V_{b_1}$ is indicated in the upper portion of FIG. 4 as vector ① at an angle, with respect to axis $V_a$, of $\varphi_1$. Similarly, for representative points 2, 3, 4, and 5 on curve 40, the corresponding quadrature voltages $V_{a_{2-5}}$ and $V_{b_{2-5}}$ produce vectors ② through ⑤, each of which is at an angle different from $\varphi_2$. Whereas, in the low index case disclosed in the application of S. E. Miller referred to hereinbefore, the maximum phase angle is ±45 degrees, the phase angle in accordance with the present invention is essentially unlimited. With the phase limitation thus removed, wide index phase modulation within a maser cavity is possible.

Accordingly, an illustrative embodiment of a phase modulator, in accordance with the present invention, and as illustrated in FIG. 7, comprises three birefringent members 18, 19 and 20 in which reference numerals correspond to those used in FIGS. 1 and 2. The first stage 18 comprises a crystal 70 of birefringent material, across which there is impressed a modulating electric field $V_a$ in a direction parallel to the direction of wave propagation through the crystal. The electric field is derived from a signal voltage as described with reference to FIG. 4, and is applied to crystal 70 in a manner dictated by the frequency of the modulating signal. For low frequency modulation, the voltage can be applied through conductive electrodes, provided with apertures to permit carrier energy flow, on the flat surfaces of the crystal.

In the specific embodiment of FIG. 7, however, stage 18 adapted for modulation at microwave frequencies by locating the birefringent crystal 70 in a resonant cavity formed by a portion of rectangular waveguides 71 and the conductive terminations 72 and 73. Termination 72 is provided with a coupling aperture 74 for coupling wave energy supplied from the source of modulating vector $V_a$. Termination 73 is shown as adjustable for tuning the cavity. Access to crystal 70 by the maser beam is provided by apertures 77 and 78 located in the wide guide walls. Since stage 18 is a polarization converter, the crystal is oriented such that the principal planes, $x$ and $y$, are inclined at an angle to the direction of polarization of the maser beam, indicated by the arrow 76. Preferably, though not necessarily, the principal planes make an angle of 45 degrees with respect to the direction of polarization of the maser beam.

The second stage 19 is in certain respects substantially the same as stage 18, comprising a birefringent crystal 80, with a source of constant potential 81 which is impressed longitudinally across crystal 80 by means of electrodes 82 and 83. The latter are provided with apertures 84 and 85 to permit the maser beam to pass through the crystal.

However, since stage 19 is a diffeerntial phase shifter, crystal 80 is oriented with its principal planes $x$ and $y$ parallel to the directions of polarization of the two wave components applied to it, thus producing a time phase shift without affecting the direction of polarization of the wave components.

Stage 20 is the second polarization converter in the modulation system, and is the converter to which the quadrature voltage $V_b$ is applied, again for microwave frequency modulation via a resonant cavity formed by rectangular wave guide section 91 and terminations 92, 93. Termintaion 92 has an aperture 94 therein to permit access of signal $V_b$ to the crystal 90, while termination 93 is adjustable to permit frequency tuning. Apertures 95, 96 in guide section 91 permit the maser beam to traverse the crystal.

Since stage 20 is a polarization converter, the crystal is again oriented with its principal planes at an angle, preferably 45 degrees, to the direction of polarization of the maser beam.

In the embodiment of FIG. 7, the external electric fields are applied parallel to the direction of maser beam wave propagation through the birefringent material. However, it is understood that the direction of the biasing field depends upon the material that is used. Thus, if a cubic material such as gallium arsenide, zinc sulfide or cuprous chloride is used, the biasing field can be applied transverse to the direction of wave propagation. See, for example, United States Patent 2,788,710 for such alternate arrangements.

It should be noted that the locations of stages 18 and 20 can be reversed, since the order in which the two horizontal components A and B are induced is immaterial.

As explained hereinbefore, a portion of the maser beam is converted from a vertical polarization to a horizontal polarization as the maser beam passes through the phase modulator. As illustrated in FIG. 1, means 22 are provided to the right of the modulator section for removing from the maser cavity the horizontally polarized wave energy produced when the maser beam propagates in a direction from left to right. It is apparent, however, that an equal portion of the vertically polarized maser beam is similarly converted to horizontal polarization as the maser beam propagates through the modulator in the opposite direction, from right to left. In the absence of some means, located between the modulator 9 and active medium 10, for removing this horizontally polarized wave energy, it will propagate through the active medium, be reflected by reflector 11, and after a second passage through the active medium, will re-enter the modulator. It can readily be shown, however, by an analysis similar to that given above, that the converted component $V_a$ produced by the modulator when the maser beam propagates therethrough in the left-to-right (or forward) direction, is out of phase with the component produced when the maser beam propagates therethrough in the right-to-left (or reverse) direction. Thus, the horizontally polarized $V_a$ components in an output signal which includes wave components generated by a forward propagating and a reverse propagating maser beam would cancel, leaving an output signal which only includes amplitude modulated components $V_b$, a signal which is not phase modulated.

There are a number of ways of avoiding this difficulty. The first is to rely upon the polarization selectivity of the Brewster angle tube ends 14 and 15, as is done in the embodiment of FIG. 1. By raising the refractive index of the end materials, the horizontally polarized components traveling in the reverse direction can be substantially eliminated.

Alternatively, a second Nicol prism, placed in FIG. 1 between the tube 13 containing the active medium 10 and the modulator 9, could be used to couple out the reverse propagating horizontally polarized, phase modulated signal. Thus, the horizontally polarized, phase modulated signal produced in traversing the modulator from left to right is coupled out of the cavity by prism 22, whereas the horizontally polarized, phase modulated signal produced in traversing the modulator from right to left would be coupled out of the cavity by the second prism.

In FIG. 5, there is shown an alternate embodiment of the invention adapted for combining the phase modulated signals produced in the forward and reverse directions into a single output signal. Basically, the device is similar to the embodiment of FIG. 1, comprising an active medium 10 contained within tube 13 and located within a cavity defined by reflectors 11, 12, 50, and 51. Also located within the cavity is a phase modulator comprising elements 18, 19, and 20, a beam splitter 52, and the polarization selective reflector 53. The latter, as shown in FIG. 5, is located between the modulation structure and tube 13, with the beam splitter 52 positioned on the laser beam between the reflector 53 and the modulation structure.

The modulator of FIG. 5 operates in a manner now to be described to produce a wide index phase modulated signal which is $\sqrt{2}$ times the output voltage level of the modulator of FIG. 1. The output wave amplitude of laser 10 is defined as $v_1$ and, being vertically polarized, is transmitted unaffected by polarization selective prism 53 and is incident upon beam splitter 52, which can be a half silvered mirror positioned at 45 degrees to major beam axis 54. Beam splitter 52 divides wave $v_1$ into a first component portion $v_1/\sqrt{2}$ which is deflected downward toward reflector 51 and a second component portion $v_1/\sqrt{2}$ which passes through the splitter toward reflector 12. This vertically polarized energy is reflected by reflectors 51, 12 and, being properly phased at the beam splitter, recombines and travels back toward the laser 10, again being unaffected by polarization selector 53. No vertically polarized energy is reflected toward reflector 50.

Upon passage of the respective beam portions through converters 18 and 20, to which modulating quadrature voltages $V_a$ and $V_b$ as defined hereinbefore are applied, converted components of horizontally polarized energy of amplitude $A/\sqrt{2}$ (or $B/\sqrt{2}$) are generated. Thus, the total amplitude propagating back toward hybrid 52 along path 55 is $\sqrt{2}A$ while that propagating back along path 54' toward hybrid 52 is $\sqrt{2}B$.

Section 19, a differential phase shift section, retards $\sqrt{2}B$ by 45 degrees on each passage therethrough, resulting in a total phase lag at the hybrid 52 of 90 degrees between the $\sqrt{2}B$ component and the $\sqrt{2}A$ component.

At the hybrid, the reflected components are once again split upon incidence, with two wave portions of amplitude A and two wave portions of amplitude B resulting. A first component of amplitude A and a first component of amplitude B propagate directly toward polarization selector 53 and the remaining two similar components are deflected toward reflector 50, from which they are reflected back toward hybrid 52 to combine thereat with the first components and to propagate therewith toward the coupler 53 as a component of amplitude $\sqrt{2}A$ and one of amplitude $\sqrt{2}B$ in time quadrature. Since these components are all horizontally polarized, they are deflected from the laser cavity by coupler 25 and are available as a phase modulated wave for external use.

The major advantage of the embodiment of FIG. 5 over the embodiment of FIG. 1 is the increased power output realized by eliminating the waste of converted component energy through deflection from the Brewster angle windows of the laser.

In all embodiments of the invention, the amplitude of the horizontal cross components is preferably kept small compared to the amplitude of the maser beam to prevent undue loading of the maser. Thus, the maximum amplitude depends upon the particular maser and its ability to tolerate loading. The minimum amplitude depends upon the ability of the rest of the system to sense and utilize small signals. This is a function of the inherent noise in the system. Theoretically, the modulator can operate down to zero amplitude. Typically, however, the horizontal component amplitudes will fall within a range from 20 percent of the maser beam amplitude to one or two percent.

The individual stages described for producing the various signal components are understood to be merely illustrative at a specific frequency range, and it is not intended that the invention be limited to these particular examples. Thus, in all cases it is to be understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and the scope of the invention.

What is claimed is:

1. In combination, an active medium disposed within a cavity adapted for the generation of a beam of electromagnetic wave energy;

polarizing means associated with said cavity for polarizing said beam in a first direction;

modulating means within said cavity for phase modulating a portion of the wave energy within said beam comprising:

first polarization converting means for inducing a first wave component of varying amplitude polarized in a second direction perpendicular to said first direction, means for introducing a ninety degree time phase shift between orthogonally directed wave components, and second polarization converting means for inducing a second wave component of varying amplitude polarized in said second direction;

and polarization selective means for extracting said first and second wave components from said cavity.

2. The combination according to claim 1 in which said cavity comprises a pair of reflecting surfaces and in which said polarization selective means is located between said second polarization converting means and one of said reflectors.

3. The combination according to claim 1 in which said first polarization converting means comprises a birefringent material oriented with its principal planes at an angle to said first direction of polarization, said delay means comprises a birefringent material oriented with one of its principal planes parallel to said first direction of polarization, and said second polarization converting means comprises a birefringent material oriented with its principal planes at an angle to said first direction of polarization.

4. The combination according to claim 3 in which said first and second polarization converting means are electrically biased by means impressing varying electric fields, and said delay means is electrically biased by means impressing a constant electric field.

5. The combination according to claim 4 in which said varying electric fields are identical in amplitude variation and are displaced in time quadrature.

6. In combination;

a maser oscillator comprising an active medium disposed within a cavity defined by a plurality of reflective surfaces, said cavity being supportive of a beam of electromagnetic wave energy;

polarization means within said cavity for polarizing said beam in a first direction;

an optical hybrid disposed within said cavity between said active medium and all but one of said plurality of reflective surfaces;

modulating means located within said cavity for phase modulating a portion of the wave energy within said beam comprising:

a first polarization converter located in the path of energy reflected by said hybrid for inducing a first wave component of varying amplitude polarized in a second direction perpendicular to said first direction;

a second polarization converter located in the path of energy transmitted by said hybrid for inducing a second wave component of varying amplitude polarized in said second direction;

and means in said transmitted energy path for introducing a 90 degree time phase shift between orthogonally directed components;

and polarization selective means located between said active medium and said modulator for extracting from said activity said wave components polarized in said second direction.

7. The combination according to claim 6 wherein reflected energy path and said transmitted energy path are terminated by ones of said plurality of reflective surfaces.

8. The combination according to claim 6 wherein said first and second wave components are generated by means impressing identical voltages in time quadrature on birefringent elements.

9. A phase modulator comprising means for directing a beam of optical frequency electromagnetic wave energy along a given axis, means for linearly polarizing the energy in said beam in a first direction, first polarization converting means for inducing a first wave component of varying amplitude polarized in a second direction perpendicular to said first direction, means for introducing a 90 degree time phase shift between orthogonally directed wave components, second polarization converting means for inducing a second wave component of varying amplitude polarized in said second direction, and polarization selective means for diverting said first and second wave components from said axis.

References Cited

UNITED STATES PATENTS

| 3,229,223 | 1/1966 | Miller | 250—199 X |
| 3,239,671 | 3/1966 | Buhrer | 250—199 |
| 3,297,876 | 1/1967 | De Maria | 250—199 |

JOHN W. CALDWELL, *Primary Examiner.*

A. MAYER, *Assistant Examiner.*